US011053833B2

(12) United States Patent
Chinzei et al.

(10) Patent No.: US 11,053,833 B2
(45) Date of Patent: Jul. 6, 2021

(54) EXHAUST GAS PURIFICATION CATALYST

(71) Applicants: Isao Chinzei, Toyota (JP); Masahide Miura, Toyota (JP); Seiji Nakahigashi, Toyota (JP); Hiromasa Suzuki, Toyota (JP); Toshio Yamamoto, Nagakute (JP); Akira Morikawa, Nagakute (JP); Satoru Katoh, Nagakute (JP); Takashi Onozuka, Kakegawa (JP); Hirotaka Ori, Kakegawa (JP); Mitsuyoshi Okada, Kakegawa (JP); Sho Hoshino, Kakegawa (JP)

(72) Inventors: Isao Chinzei, Toyota (JP); Masahide Miura, Toyota (JP); Seiji Nakahigashi, Toyota (JP); Hiromasa Suzuki, Toyota (JP); Toshio Yamamoto, Nagakute (JP); Akira Morikawa, Nagakute (JP); Satoru Katoh, Nagakute (JP); Takashi Onozuka, Kakegawa (JP); Hirotaka Ori, Kakegawa (JP); Mitsuyoshi Okada, Kakegawa (JP); Sho Hoshino, Kakegawa (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/857,566

(22) Filed: Apr. 24, 2020

(65) Prior Publication Data
US 2020/0355106 A1 Nov. 12, 2020

(30) Foreign Application Priority Data
May 9, 2019 (JP) .............................. JP2019-088769

(51) Int. Cl.
*F01N 3/28* (2006.01)
*B01J 35/04* (2006.01)
(52) U.S. Cl.
CPC ............ *F01N 3/2803* (2013.01); *B01J 35/04* (2013.01); *F01N 2370/02* (2013.01); *F01N 2510/068* (2013.01)

(58) Field of Classification Search
CPC ............... F01N 3/2083; F01N 2370/02; F01N 2510/068; B01J 35/04
USPC ........................................................ 422/168
See application file for complete search history.

(56) References Cited

U.S. PATENT DOCUMENTS

| 8,568,674 B1 * | 10/2013 | Sung | ...................... B01J 35/023 |
| | | | 423/213.2 |
| 2010/0101212 A1 | 4/2010 | Iwachido et al. | |
| 2017/0291163 A1 * | 10/2017 | Saito | .................... B01J 37/0215 |

FOREIGN PATENT DOCUMENTS

| JP | 2010104897 A | 5/2010 | | |
| JP | 2012240027 A | 12/2012 | | |
| JP | 2017104825 A | 6/2017 | | |
| JP | 2017115690 A | 6/2017 | | |
| WO | WO-2014132034 A1 * | 9/2014 | .............. | B01J 23/44 |

* cited by examiner

*Primary Examiner* — Tom P Duong
(74) *Attorney, Agent, or Firm* — Dickinson Wright, PLLC

(57) ABSTRACT

The present disclosure provides the exhaust gas purification catalyst with the improved purification performance under the high Ga condition and the atmosphere where the A/F is rich. The present disclosure relates to an exhaust gas purification catalyst including a catalyst coating layer on a substrate, the catalyst coating layer containing a noble metal and a metal oxide, wherein in the catalyst coating layer: an average thickness of the coating layer is in a range from 50 μm to 100 μm; a porosity measured by a weight-in-water method is in a range from 50% by volume to 80% by volume; and high-aspect-ratio pores having an aspect ratio of 5 or more account for 0.5% by volume to 50% by volume of a whole volume of voids, the high-aspect-ratio pore having an equivalent circle diameter in a range from 2 μm to 50 μm in a cross-sectional image of a catalyst coating layer cross section perpendicular to an exhaust gas flow direction of the substrate and having an average aspect ratio in a range from 10 to 50, and wherein when a surface side in contact with an exhaust gas in a thickness direction of the catalyst coating layer is defined as 0% and a side in contact with the substrate is defined as 100%, 80% by mass or more of a total amount of the noble metal is present in a range from 0% to 25% or more and 70% or less.

8 Claims, 5 Drawing Sheets

EXHAUST GAS PURIFICATION CATALYST

CROSS REFERENCE TO RELATED APPLICATIONS

The present application claims priority from Japanese patent application JP 2019-088769 filed on May 9, 2019, the content of which is hereby incorporated by reference into this application.

BACKGROUND

Technical Field

The present disclosure relates to an exhaust gas purification catalyst. More specifically, the present disclosure relates to an exhaust gas purification catalyst featuring that a catalyst coating layer having high-aspect-ratio pores at a certain rate has a concentration gradient of a noble metal in a thickness direction.

Description of Related Art

Exhaust gas discharged from an internal combustion engine of an automotive or the like includes harmful gases such as carbon monoxide (CO), nitrogen oxides (NOx), and unburned hydrocarbon (HC). An exhaust gas purification catalyst for decomposition of such harmful gases is also referred to as a "three-way catalyst", and commonly has a honeycomb-shaped monolith substrate made of cordierite or the like and a catalyst coating layer formed thereon by wash coating of a slurry including noble metal particles having catalytic activity and an auxiliary catalyst having oxygen storage capacity (OSC).

Various approaches have been made in order to enhance purification efficiency of the exhaust gas purification catalyst. There is known, for example, a procedure where a void is formed in a catalyst coating layer in order to enhance diffusivity of exhaust gas in the catalyst coating layer. For example, known methods for forming a void in a catalyst coating layer involve increasing the particle size of a catalyst particle, or use of a pore-forming material which disappears in firing of a catalyst at the final stage of production to provide a void. For example, JP 2010-104897 A describes a method where a void is provided by adding magnesia having a particle size of 0.1 to 3.0 µm to form a catalyst layer.

If a void is provided in a catalyst layer, however, the thickness of the catalyst layer may be increased due to the void, and therefore the pressure loss of the catalyst may be increased to cause engine output power and/or fuel efficiency to be lowered. In addition, due to the void provided by any of the above methods, for example, the strength of the catalyst layer may be decreased, or a sufficient effect may be not obtained because of poor void linkage. In view of the above, for example, JP 2012-240027 A describes a method where a carbon compound material having a predetermined shape is mixed and is allowed to disappear in catalyst firing to thereby provide a void in a catalyst layer, the void having a mode in the frequency distribution with respect to the depth to length ratio (D/L) in the cross section of 2 or more.

Meanwhile, a technique to support a noble metal to a catalyst coating layer to control a support density and a supported part of the noble metal has been studied. For example, JP 2017-104825 A discloses a catalytic converter that includes a substrate and a catalyst layer. The substrate has a cell structure through which an exhaust gas flows. The catalyst layer is formed on cell wall surfaces of the substrate. The catalyst layer includes a first catalyst layer on an upstream in an exhaust gas flow direction and a second catalyst layer on a downstream in the exhaust gas flow direction. The first catalyst layer includes a noble metal catalyst at a uniform concentration in a thickness direction. The second catalyst layer has a concentration distribution in which the concentration of the noble metal catalyst decreases from a superficial layer to the substrate side. Starting from an end portion on the upstream of the substrate, the first catalyst layer is formed in a range from 10 to 90% of an overall length of the substrate. In a case where, in the second catalyst layer, a 20% range of a total thickness from the superficial layer of the second catalyst layer is define as a superficial layer portion, a 20% range of a total thickness from an end surface on the substrate side of the second catalyst layer is define as a deep portion, a concentration of the noble metal catalyst in the superficial layer portion is denoted as A (% by mass), and a concentration of the noble metal catalyst in the deep portion is denoted as B (% by mass), AB is larger than 1.

Furthermore, J P 2017-115690 A discloses an exhaust emission purification device that includes a trap catalyst and an oxidation catalyst. The trap catalyst is disposed on an exhaust passage of an engine and has a function that absorbs and reduces nitrogen oxide in an exhaust gas. In the trap catalyst, a noble metal support density on a superficial layer side is set higher than that on a base layer side. The oxidation catalyst is disposed on an upstream side with respect to the trap catalyst and has a function that oxidizes the nitrogen oxide. In the oxidation catalyst, a noble metal support density on the base layer side is set higher than that of the superficial layer side.

SUMMARY

In compliance to a strict emissions regulation, such as the SULEV20, it is desired to improve a purification performance under a condition of a high intake air mass in acceleration or the like (a high intake air mass or under a high Ga condition: being the same as a high space velocity or under a high SV condition) in an atmosphere where an air-fuel ratio (A/F) is rich. In such a field, even JP 2010-104897 A, JP 2012-240027 A, JP 2017-104825 A, and JP 2017-115690 A in which an improvement in the purification performance has been recognized need to use a large amount of the expensive noble metal for compliance to a further strict emissions regulation. That is, in the light of the cost, a new noble metal supporting technique to improve the purification performance with a further small amount of noble metal is required.

Accordingly, an object of the present disclosure is to provide an exhaust gas purification catalyst with an improved purification performance under a high Ga condition and an atmosphere where an A/F is rich.

As a result of intensive studies, the present inventors have found the following and have completed the present disclosure. In a catalyst coating layer having high-aspect-ratio pores excellent in communicability and excellent in gas diffusivity prepared by using organic fibers having a predetermined shape as a pore-forming material, a concentration gradient of a noble metal is formed in a thickness direction. This improves a NOx conversion performance under a high Ga condition and an atmosphere where an A/F is rich.

That is, the gist of the present disclosure is as follows.
(1) An exhaust gas purification catalyst comprising a catalyst coating layer on a substrate, the catalyst coating layer containing a noble metal and a metal oxide, wherein in the catalyst coating layer:
an average thickness of the coating layer is in a range from 50 μm to 100 μm;
a porosity measured by a weight-in-water method is in a range from 50% by volume to 80% by volume; and
high-aspect-ratio pores having an aspect ratio of 5 or more account for 0.5% by volume to 50% by volume of a whole volume of voids, the high-aspect-ratio pore having an equivalent circle diameter in a range from 2 μm to 50 μm in a cross-sectional image of a catalyst coating layer cross section perpendicular to an exhaust gas flow direction of the substrate and having an average aspect ratio in a range from 10 to 50, and
wherein when a surface side in contact with an exhaust gas in a thickness direction of the catalyst coating layer is defined as 0% and a side in contact with the substrate is defined as 100%, 80% by mass (mass %) or more of a total amount of the noble metal is present in a range from 0% to 25% or more and 70% or less.

(2) The exhaust gas purification catalyst according to (1), wherein in the catalyst coating layer, the high-aspect-ratio pore is oriented such that a value of an 80% cumulative angle, in a cumulative angle distribution on an angle basis, of an angle (cone angle) between a vector in a longitudinal direction of the high-aspect-ratio pore and a vector in the exhaust gas flow direction of the substrate is in a range from 0 to 45 degrees.

(3) The exhaust gas purification catalyst according to (1) or (2), wherein in the catalyst coating layer, an amount of coating is in a range from 50 g/L to 300 g/L based on a unit volume of the substrate.

(4) The exhaust gas purification catalyst according to any one of (1) to (3), wherein when a surface side in contact with the exhaust gas is defined as 0% and a side in contact with the substrate is defined as 100% in the thickness direction of the catalyst coating layer, 80% by mass or more of a total amount of the noble metal is present in a range from 0% to 27% or more and 66% or less.

Effects

The present disclosure provides the exhaust gas purification catalyst with the improved purification performance under the high Ga condition and the atmosphere where the A/F is rich.

DETAILED DESCRIPTION OF THE EMBODIMENTS

[Exhaust Gas Purification Catalyst]

Figure 1:
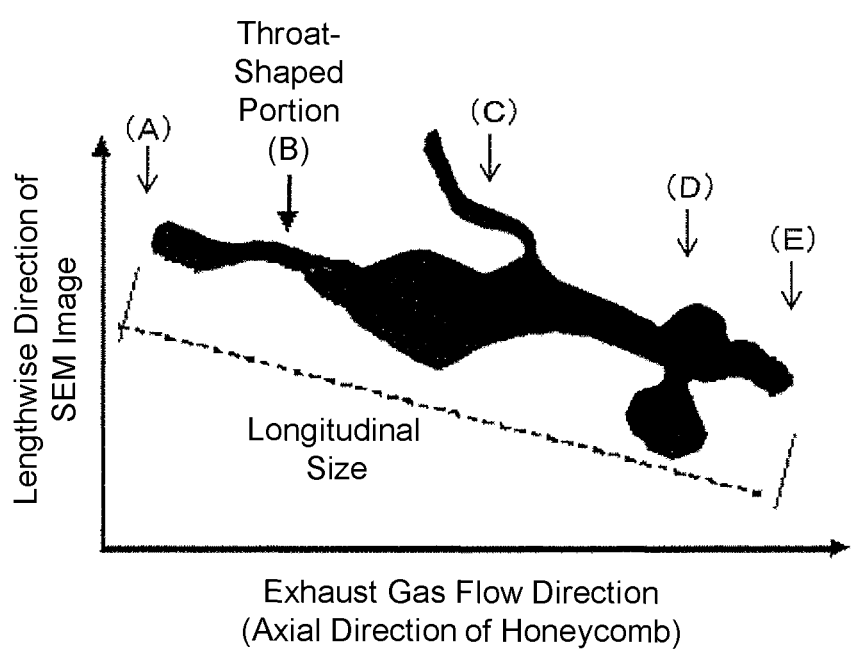
FIG. 1 is a two-dimensional projection diagram exemplifying three-dimensional information on a pore obtained by analyzing a continuous cross-sectional image of a catalyst coating layer cross section perpendicular to an exhaust gas flow direction of a substrate of an exhaust gas purification catalyst of the present disclosure.

The exhaust gas purification catalyst of the present disclosure includes a catalyst coating layer on a substrate. The catalyst coating layer contains a noble metal and a metal oxide. In the catalyst coating layer, an average thickness of the coating layer is in a range from 50 μm to 100 μm; a porosity measured by a weight-in-water method is in a range from 50% by volume to 80% by volume; and high-aspect-ratio pores having an aspect ratio of 5 or more account for 0.5% by volume to 50% by volume of a whole volume of voids, the high-aspect-ratio pore having an equivalent circle diameter in a range from 2 μm to 50 μm in a cross-sectional image of a catalyst coating layer cross section perpendicular to an exhaust gas flow direction of the substrate and having an average aspect ratio in a range from 10 to 50. When a surface side in contact with an exhaust gas in a thickness direction of the catalyst coating layer is defined as 0% and a side in contact with the substrate is defined as 100%, 80% by mass or more of a total amount of the noble metal is present in a range from 0% to 25% or more and 70% or less.

(Substrate)

A known substrate having a honeycomb shape can be used as the substrate of the exhaust gas purification catalyst of the present disclosure, and a honeycomb-shaped monolith substrate (honeycomb filter, high-density honeycomb or the like) or the like may be adopted. The material of such a substrate is also not particularly limited, and a substrate made of ceramics such as cordierite, silicon carbide, silica, alumina, and mullite, or a substrate made of a metal such as stainless steel including chromium and aluminum may be adopted. In some embodiments, cordierite may be used among them in terms of cost.

(Catalyst Coating Layer)

The catalyst coating layer in the exhaust gas purification catalyst of the present disclosure is formed on a surface of the substrate, and may be configured from one layer or two or more layers, namely, two layers, three layers, or four or more layers. In some embodiments, the catalyst coating layer in the exhaust gas purification catalyst of the present disclosure may be configured from one layer. Each catalyst coating layer needs not to be necessarily uniform over the entire substrate of the exhaust gas purification catalyst, and may have a different composition depending on each part of the substrate, for example, depending on each of an upstream zone and a downstream zone in an exhaust gas flow direction. In a case where the catalyst coating layer is configured from two or more layers, the catalyst coating layer can be classified into a catalyst coating layer as an uppermost layer and catalyst coating layer(s) present below the layer. As described later, the catalyst coating layer as the uppermost layer has a structure having the large number of voids and forming a concentration gradient of the noble metal in a thickness direction.

The catalyst coating layer includes a noble metal serving as a main catalyst, a metal oxide, and the like. Specific examples of the metal oxide include aluminum oxide ($Al_2O_3$, alumina), lanthanum oxide ($La_2O_3$), cerium oxide ($CeO_2$, ceria), zirconium oxide ($ZrO_2$, zirconia), yttrium oxide ($Y_2O_3$, yttria), silicon oxide ($SiO_2$, silica), and neodymium oxide (Nd$_2$O$_3$), as well as composite oxides thereof. Such metal oxides may be used in combinations of two or more.

Specific examples of the noble metal include platinum (Pt), palladium (Pd), rhodium (Rh), gold (Au), silver (Ag), iridium (Ir) and ruthenium (Ru). In some embodiments, at least one selected from the group consisting of Pt, Rh, Pd, Ir and Ru may be used among them in terms of catalyst performance. In some embodiments, at least one selected from the group consisting of Pt, Rh and Pd may be used among them in terms of catalyst performance. In some embodiments, one noble metal may be used per catalyst coating layer.

In some embodiments, the noble metal may be supported on the metal oxide described above. The amount of the noble metal to be supported is not particularly limited, and an appropriate amount thereof may be supported depending on the intended design and the like. In some embodiments, the content of the noble metal may be 0.01 parts by mass to 10 parts by mass, in terms of metal, based on 100 parts by mass of the catalyst coating layer. In some embodiments, the content of the noble metal may be 0.01 parts by mass to 5 parts by mass, in terms of metal, based on 100 parts by mass of the catalyst coating layer. While too small an amount of the noble metal supported tends to result in an insufficient catalytic activity, and on the other hand, too large an amount thereof tends to cause saturation of catalytic activity and an increase in cost. Any amount in the above range does not cause such problems.

In the catalyst coating layer of the present disclosure, when the surface side in contact with the exhaust gas in the thickness direction of the catalyst coating layer is defined as 0% and the side in contact with the substrate is defined as 100%, 80% by mass or more of the total amount of the noble metal present in the catalyst coating layer is present in the range from 0% to 25% or more and 70% or less (that is, between 0% and 25% to 70%). In some embodiments, the 80% by mass or more of the total amount of the noble metal present in the catalyst coating layer may be in the range from 0% to 27% or more and 66% or less (that is, between 0% and 27% to 66%). In some embodiments, the 80% by mass or more of the total amount of the noble metal present in the catalyst coating layer may be in the range from 0% to 35% or more and 60% or less (that is, between 0% and 35% to 60%). Note that % in the thickness direction of the catalyst coating layer indicates a proportion of a depth from the surface side in contact with the exhaust gas of the catalyst coating layer when the whole thickness of the catalyst coating layer is defined as 100.

Regarding a support distribution of the noble metal present in the catalyst coating layer, a supporting state to the material can be confirmed, for example, through observation of the catalyst coating layer with an Electron Probe Micro Analyzer (EPMA) and an elementary analysis.

In some embodiments, the amount of coating of one layer of the catalyst coating layer may be in the range from 50 g/L to 300 g/L based on a unit volume of the substrate. Too small an amount of coating does not impart sufficient catalytic activity performance of the catalyst and thus does not impart sufficient catalyst performance such as NOx conversion performance. On the other hand, too large an amount thereof also increases pressure loss to cause fuel efficiency to be deteriorated. Any amount in the above range does not cause such problems. In some embodiments, the amount of coating of one layer of the catalyst coating layer may be in the range from 50 g/L to 250 g/L based on the unit volume of the substrate, in terms of a balance among pressure loss, catalyst performance and durability. In some embodiments, the amount of coating of one layer of the catalyst coating layer may be in the range from 50 g/L to 200 g/L, based on the unit volume of the substrate, in terms of a balance among pressure loss, catalyst performance and durability.

The thickness of one layer of the catalyst coating layer is in the range from 50 μm to 100 μm as the average thickness. Too thin a catalyst coating layer does not impart sufficient catalyst performance. On the other hand, too thick a catalyst coating layer increases the pressure loss in passing of exhaust gas and the like to fail to impart sufficient catalyst performance such as NOx conversion performance. Any thickness in the above range does not cause such problems. In some embodiments, the thickness may be in the range from 50 μm to 100 μm, in terms of a balance among pressure loss, catalyst performance and durability. In some embodiments, the thickness may be in the range from 60 μm to 80 μm, in terms of a balance among pressure loss, catalyst performance and durability. The "thickness" of the catalyst coating layer used herein means a length of the catalyst coating layer in a direction perpendicular to the center of a flat portion of the substrate, namely, the shortest distance between the surface of the catalyst coating layer and the surface of the substrate (an interface with the lower layer catalyst coating when the lower layer catalyst coating is present). The average thickness of the catalyst coating layer can be determined by, for example, observing the catalyst coating layer with a scanning electron microscope (SEM) or an optical microscope to measure the thickness at each of any 10 points or more, and calculating the average thickness.

While the catalyst coating layer is formed mainly from the noble metal and the metal oxide, the catalyst coating layer may also further comprise other component as long as the effect of the present disclosure is not impaired. Examples of such other component include other metal oxide and an additive for use in a catalyst coating layer in such a kind of use, and specific examples include one or more of alkali metals such as potassium (K), sodium (Na), lithium (Li) and cesium (Cs), alkaline earth metals such as barium (Ba), calcium (Ca) and strontium (Sr), rare-earth elements such as lanthanum (La), yttrium (Y) and cerium (Ce), and transition metals such as iron (Fe).

A large number of voids are included in the catalyst coating layer, and the porosity thereof is in the range from 50% by volume to 80% by volume as measured by a weight-in-water method. Too low a porosity of the catalyst coating layer deteriorates gas diffusivity and thus does not impart sufficient catalyst performance. On the other hand, too high a porosity increases diffusivity to thereby increase a proportion of gas passing through the coating layer without coming in contact with a catalytic active site, not imparting sufficient catalyst performance. Any porosity in the above range does not cause such problems. In some embodiments, the porosity of the catalyst coating layer may be in the range from 50.9% by volume to 78.8% by volume, in terms of a balance between gas diffusivity and catalyst performance. In some embodiments, the porosity of the catalyst coating layer may be in the range from 54.0% by volume to 78.0% by volume, in terms of a balance between gas diffusivity and catalyst performance.

The "void(s)" in the catalyst coating layer means a space in the catalyst coating layer. The shape of the "void" is not particularly limited, and for example, may be any of spherical, elliptical, cylindrical, cuboid (rectangular column), disc, through-hole shapes, and shapes similar thereto. Such a void encompasses pores such as a micropore having an equivalent circle diameter of a cross-section, of less than 2 μm; a high-aspect-ratio pore having an equivalent circle diameter of a cross-section, of 2 μm or more, and having an aspect ratio of 5 or more; and a pore having an equivalent circle diameter of a cross-section, of 2 μm or more, and not having an aspect ratio of 5 or more. The porosity of the catalyst coating layer can be determined by, for example, subjecting an exhaust gas purification catalyst with only a catalyst coating layer to measurement by a weight-in-water method. Specifically, the porosity can be measured by, for example, a method according to a method prescribed in JIS R 2205.

In the exhaust gas purification catalyst of the present disclosure, the high-aspect-ratio pores having the aspect ratio of 5 or more account for 0.5% by volume to 50% by volume of the whole volume of voids in the catalyst coating layer. The high-aspect-ratio pore is characterized by having the equivalent circle diameter in the range from 2 μm to 50 μm in a cross-sectional image of a catalyst coating layer cross section perpendicular to an exhaust gas flow direction, and the average aspect ratio in the range from 10 to 50. Accordingly, a pore having the equivalent circle diameter of less than 2 μm is not considered to be the high-aspect-ratio pore, even if having the aspect ratio of 5 or more.

Too low the average aspect ratio of the high-aspect-ratio pore does not impart sufficient pore connectivity. On the other hand, too high the average aspect ratio thereof causes too high a gas diffusivity and thus increases a proportion of gas passing through the coating layer without coming into contact with a catalytic active site, not imparting sufficient catalyst performance. Any average aspect ratio in the range from 10 to 50 does not cause such problems. In some embodiments, the average aspect ratio of the high-aspect-ratio pore may be in the range from 10 to 35, in view of compatibility of gas diffusivity with catalyst performance. In some embodiments, the average aspect ratio of the high-aspect-ratio pore may be in the range from 10 to 30, in view of compatibility of gas diffusivity with catalyst performance.

The average aspect ratio of the high-aspect-ratio pore in the catalyst coating layer can be measured by analyzing a cross-sectional image of a catalyst coating layer cross section perpendicular to an exhaust gas flow direction (axial direction of a honeycomb-shaped substrate) of the substrate, from the three-dimensional information on the pore of the catalyst coating layer, obtained by FIB-SEM (Focused Ion Beam-Scanning Electron Microscope), X-ray CT, or the like.

Specifically, for example, in the case of FIB-SEM analysis, first, a continuous cross-sectional image (SEM image) of a catalyst coating layer cross section perpendicular to an exhaust gas flow direction of the substrate is acquired by FIB-SEM analysis. Next, the resulting continuous cross-sectional image is analyzed, and three-dimensional information on a pore having an equivalent circle diameter of a cross-section, of 2 μm or more, is extracted. FIG. 1 illustrates a two-dimensional projection diagram exemplifying analysis results of three-dimensional information on the pore, obtained by analyzing a continuous cross-sectional image of a catalyst coating layer cross section perpendicular to an exhaust gas flow direction of the substrate of the exhaust gas purification catalyst, as one example of analysis results of three-dimensional information on the pore. As is clear from the analysis results of three-dimensional information on the pore shown in FIG. 1, the shape of the pore is indefinite, and a distance for connecting a starting point and an end point in the continuous cross-sectional image (SEM image) of the pore is defined as "longitudinal size". Herein, the starting point and the end point correspond to centroids in each SEM image. Next, a constriction portion in a path for connecting the starting point and the end point at the shortest distance in the continuous cross-sectional image (SEM image) of the pore is defined. The minimum part whose equivalent circle diameter is 2 μm or more and is also minimum among the constriction portions in the cross-sectional SEM image is defined as a "throat-shaped portion," and the equivalent circle diameter thereof in the cross-sectional SEM image is defined as a "throat-shaped portion size". (while a plurality of constriction portions may be present in a pore, the throat-shaped portion size for calculating the aspect ratio is defined as follows: the minimum constriction portion is selected in the path for connecting the starting point and the end point at the shortest distance, and the equivalent circle diameter of the pore in the cross-sectional SEM image of the minimum constriction portion (throat-shaped portion) is defined as the "throat-shaped portion size".) Furthermore, the aspect ratio of the pore is defined as a "longitudinal size/throat-shaped portion size".

Figure 2:
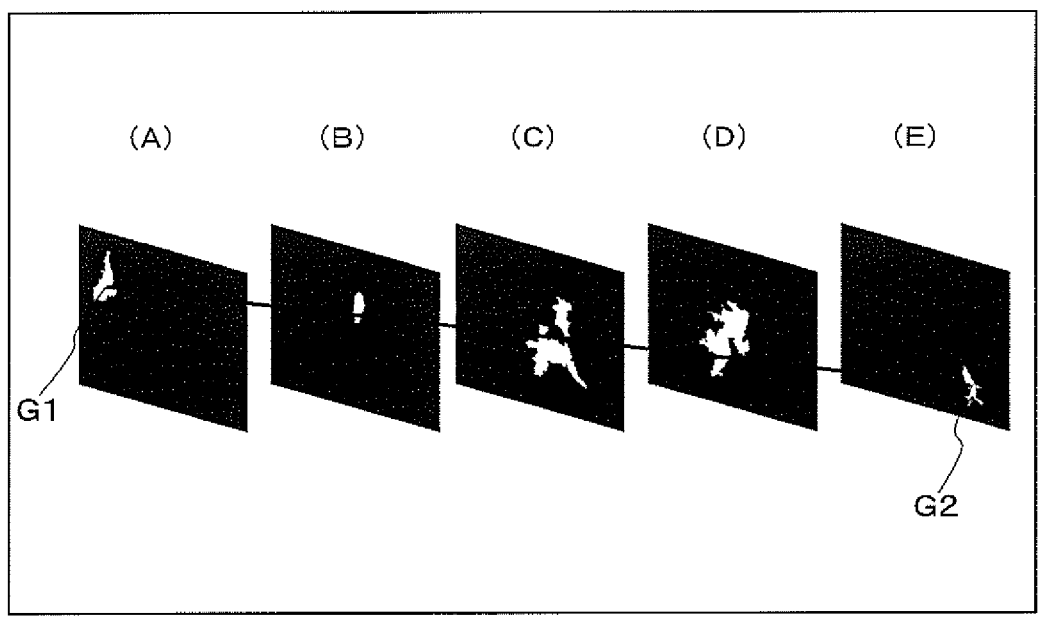
FIG. 2 is a schematic diagram illustrating the pore in the catalyst coating layer cross section at each of A to E in FIG. 1.

Next, FIG. 2 illustrates cross-sectional images (SEM images) of (A) (starting point of pore), (B) (throat-shaped portion of pore), (C) (medium point of longitudinal size of pore), (D) (maximum diameter portion having maximum equivalent circle diameter of pore), and (E) (end point of pore) in FIG. 1. FIG. 2 is a schematic diagram of a cross-sectional image (SEM image) of the pore in the catalyst coating layer cross section in (A) to (E) of FIG. 1. FIG. 2(A) is a schematic diagram of a cross-sectional image of the pore at the starting point (one end portion where the equivalent circle diameter of the pore is 2 μm or more) in the two-dimensional projection diagram of the pore illustrated in FIG. 1, and G1 represents centroid of the pore in the cross-sectional image. FIG. 2(B) is a schematic diagram of the cross-sectional image of the pore in the throat-shaped portion (which has an equivalent circle diameter of the pore of 2 μm or more and is the minimum constriction portion in the path for connecting the starting point and the end point at the shortest distance) in the two-dimensional projection diagram of the pore illustrated in FIG. 1. FIG. 2(C) is a schematic diagram of the cross-sectional image of the pore at the medium point in the path for connecting the starting point and the end point of the longitudinal size at the shortest distance in the two-dimensional projection diagram of the pore illustrated in FIG. 1. FIG. 2(D) is a cross-sectional image of the pore at a position where the equivalent circle diameter of the pore is maximum in the path for connecting the starting point and the end point of the longitudinal size at the shortest distance in the two-dimensional projection diagram of the pore illustrated in FIG. 1. FIG. 2(E) is a schematic diagram of a cross-sectional image of the pore at the end point (other end portion where the equivalent circle diameter of the pore is 2 μm or more) in the two-dimensional projection diagram of the pore illustrated in FIG. 1, and G2 represents centroid of the pore in the cross-sectional image. Here, the linear distance for connecting the starting point (G1 in FIG. 2(A)) of the pore and the end point (G2 in FIG. 2(E)) of the pore in FIG. 2 is defined as the "longitudinal size". In addition, a portion where the equivalent circle diameter in the cross-sectional SEM image is 2 μm or more and is minimum, among the constriction portions in the path for connecting the starting point and the end point of the pore at the shortest distance, is defined as a "throat-shaped portion", and the equivalent circle diameter thereof in the cross-sectional SEM image is defined as a "throat-shaped portion size". The aspect ratio of the pore is defined as a "longitudinal size/throat-shaped portion size". Furthermore, the "average aspect ratio of the high-aspect-ratio pore in the catalyst coating layer" can be determined as follows: aspect ratios of pores are determined in an area of 500 or more in the horizontal direction to the substrate flat portion of the catalyst coating layer, 25 μm or more in the perpendicular direction and 1000 μm or more in the axial direction to the substrate flat portion, or any area corresponding thereto; and the average aspect ratio of the high-aspect-ratio pore having an aspect ratio of 5 or more among the pores determined is calculated.

As described above, the rate of the high-aspect-ratio pores relative to the whole volume of voids in the catalyst coating layer is in the range from 0.5% by volume to 50% by volume. Too low a rate thereof causes poor pore connectivity. On the other hand, too high a rate thereof causes insufficient gas diffusivity in a direction perpendicular to an exhaust gas flow direction, not imparting sufficient catalyst performance and also causing peeling or the like due to reduction in strength of the catalyst coating layer. Any rate in the above range does not cause such problems. In some embodiments, the rate of the high-aspect-ratio pore relative to the whole volume of voids may be in the range from 0.6% by volume to 40.9% by volume, in terms of a balance among gas diffusivity, catalyst performance, and strength of the catalyst coating layer. In some embodiments, the rate of the high-aspect-ratio pore relative to the whole volume of voids may be in the range from 1% by volume to 30.1% by volume, in terms of a balance among gas diffusivity, catalyst performance, and strength of the catalyst coating layer.

The rate of the high-aspect-ratio pore relative to the whole volume of voids in the catalyst coating layer can be determined by dividing the porosity of the high-aspect-ratio pore (in an area of 500 μm or more in the horizontal direction to the substrate flat portion of the catalyst coating layer, 25 μm or more in the perpendicular direction to the substrate flat portion, and 1000 μm or more in the axial direction to the substrate flat portion, or any area corresponding thereto) by the porosity of the catalyst coating layer as measured by a weight-in-water method.

Furthermore, in the catalyst coating layer, the high-aspect-ratio pore may be oriented such that an 80% cumulative angle, in a cumulative angle distribution on an angle basis, of an angle (cone angle) between a vector in a longitudinal direction of the high-aspect-ratio pore and a vector in an exhaust gas flow direction of the substrate is in a range from 0 degree to 45 degrees in some embodiments. Thus, the gas diffusivity in an exhaust gas flow direction (axial direction of a honeycomb-shaped substrate) can be particularly enhanced to thereby enhance the efficiency of utilization of an active site. Too large an 80% cumulative angle tends to cause an insufficient component in the axial direction of the gas diffusivity, reducing the efficiency of utilization of an active site. Any angle in the above range does not cause such problems. In some embodiments, the 80% cumulative angle may be in the range from 15 degrees to 45 degrees, in terms of catalyst performance. In some embodiments, the 80% cumulative angle may be in the range from 30 degrees to 45 degrees, in terms of catalyst performance.

Figure 3:
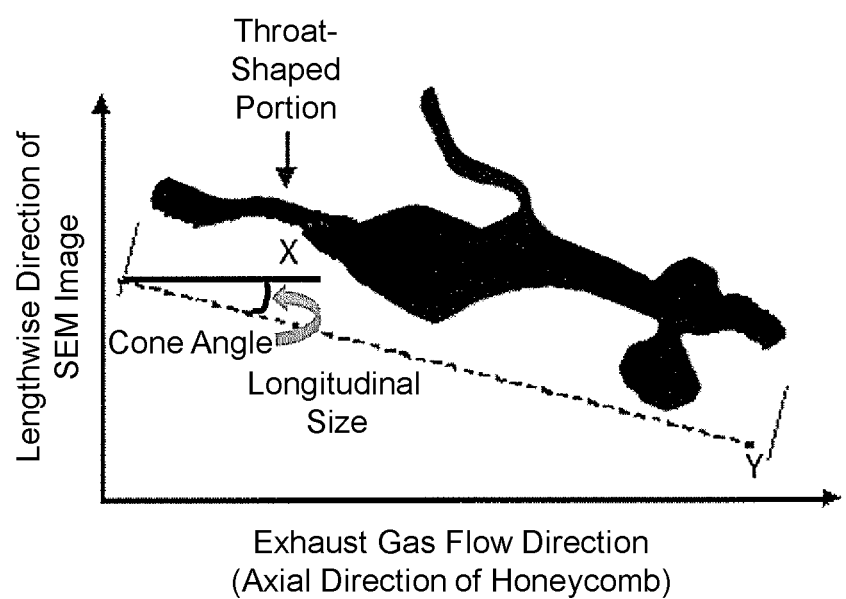
FIG. 3 is a schematic diagram illustrating a cone angle of the high-aspect-ratio pore in the two-dimensional projection diagram of FIG. 1.

The cone angle (orientation angle) of the high-aspect-ratio pore in the catalyst coating layer can be measured by analyzing the cross-sectional image of a catalyst coating layer cross section perpendicular to an exhaust gas flow direction (axial direction of a honeycomb-shaped substrate) of the substrate from the three-dimensional information on the pore of the catalyst coating layer. Specifically, for example, in the case of FIB-SEM analysis, the "cone angle" can be determined from an angle between a vector in a longitudinal direction resulting from the "longitudinal size" of the high-aspect-ratio pore obtained as above and a vector in an exhaust gas flow direction of the substrate. FIG. 3 is a schematic diagram illustrating a cone angle (orientation angle) of the high-aspect-ratio pore, and also illustrating one example of a method for determining the "cone angle". FIG. 3 illustrates a vector (Y) in a longitudinal direction of the high-aspect-ratio pore and a vector (X) in an exhaust gas flow direction of the substrate in the two-dimensional projection diagram in FIG. 1, and an angle between the vector (Y) in the longitudinal direction and the vector (X) in an exhaust gas flow direction of the substrate is defined as the "cone angle". The three-dimensional information on the pore (three-dimensional image) can be subjected to image analysis, to thereby calculate the 80% cumulative angle, in a cumulative angle distribution on an angle basis, of the cone angle. Herein, the 80% cumulative angle, in a cumulative angle distribution on an angle basis, of the cone angle of the high-aspect-ratio pore means a cone angle of the aspect-ratio pore which corresponds to the cone angle at 80% in terms of frequency (a cumulative frequency of 80%, on an angle basis of the cone angle) relative to the total number of the high-aspect-ratio pores when the number of the high-aspect-ratio pores is counted from the high-aspect-ratio pore having the smallest cone angle (degrees) in the ascending order. Herein, the 80% cumulative angle, in a cumulative angle distribution on an angle basis, of the cone angle of the high-aspect-ratio pore can be determined by randomly extracting 20 or more of the high-aspect-ratio pores, and determining the 80% cumulative angle, in a cumulative angle distribution on an angle basis, of the cone angle of each of the high-aspect-ratio pores to provide an average value.

Figure 4:
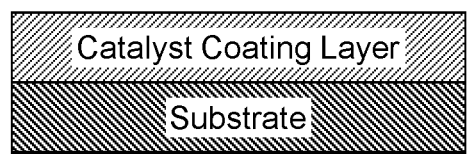
FIG. 4 is a diagram schematically illustrating an example of a structure of the exhaust gas purification catalyst of the present disclosure.

FIG. 4 schematically illustrates an example of a structure of the exhaust gas purification catalyst of the present disclosure. In FIG. 4, the catalyst coating layer containing the noble metal is coated on the substrate. The catalyst coating layer has the high-aspect-ratio pores at a certain rate and the concentration gradient of the noble metal in the thickness direction.

The catalyst coating layer of the present disclosure has the large number of voids as described above and forms the concentration gradient of the noble metal in the thickness direction. Accordingly, the exhaust gas purification catalyst including the catalyst coating layer of the present disclosure can provide the sufficient purification performance with the small amount of the noble metal even under the high Ga condition and the atmosphere where the A/F is rich.

Embodiments of Use of Exhaust Gas Purification Catalyst

The exhaust gas purification catalyst of the present disclosure may be used singly or in combination with other catalyst. Such other catalyst is not particularly limited, and a known catalyst (for example, in the case of an exhaust gas purification catalyst for automotives, an oxidation catalyst, a NOx reduction catalyst, a NOx storage reduction catalyst (NSR catalyst), a lean NOx trap catalyst (LNT catalyst), a NOx selective reduction catalyst (SCR catalyst), or the like) may be appropriately used.

[Method for Producing Exhaust Gas Purification Catalyst]

The method for producing an exhaust gas purification catalyst of the present disclosure, in which the exhaust gas purification catalyst has on a substrate a catalyst coating layer containing a novel metal and a metal oxide, includes the steps of forming a catalyst coating layer precursor using a catalyst slurry including metal oxide particles, and a fibrous organic substance in an amount of 0.5 parts by mass to 9.0 parts by mass based on 100 parts by mass of the metal oxide particles and supporting noble metal particles having catalytic activity to the catalyst coating layer precursor. The fibrous organic substance has an average fiber diameter in a range from 1.7 µm to 8.0 µm and an average aspect ratio in a range from 9 to 40. When coating the substrate with the catalyst slurry and then heating the catalyst slurry, at least a part of the fibrous organic substance may be removed to form voids in the catalyst coating layer. Herein, in a case where the catalyst coating layer is configured from two or more layers, the lower catalyst coating layer(s) located lower with respect to the uppermost catalyst coating layer, in the catalyst coating layers, can be formed by a conventionally known method, for example, using a catalyst slurry containing a novel metal and a metal oxide and containing no fibrous organic substance.

(Metal Oxide Particles)

The metal oxide particles are the same as described above with respect to the metal oxide contained in the catalyst coating layer of the exhaust gas purification catalyst of the present disclosure. A preparation method of the metal oxide particles is not particularly limited, and a known method can be appropriately adopted. As the metal oxide particles, a commercially available product may also be used. Examples of the metal oxide particles for use in the method of the present disclosure include metal oxide particles (including composite oxide particles) prepared by a known method, commercially available metal oxide particles (including composite oxide particles) or a mixture thereof, or a dispersion liquid obtained by dispersing the particles into, for example, a solvent, such as ion-exchange water.

A particle size of the metal oxide particles is not limited. In some embodiments, the particle size of the metal oxide particles may be usually from 0.1 µm to 10 µm by a value of a 50% cumulative size in a cumulative particle size distribution on a volume basis. In some embodiments, the particle size of the metal oxide particles may be from 1 µm to 8 µm by a value of a 50% cumulative size in a cumulative particle size distribution on a volume basis. In some embodiments, the particle size of the metal oxide particles may be from 3 µm to 8 µm by a value of a 50% cumulative size in a cumulative particle size distribution on a volume basis.

(Preparation and Coating of Catalyst Slurry)

In the method for producing the exhaust gas purification catalyst of the present disclosure, the catalyst slurry is used, and the catalyst slurry contains the metal oxide particles and the fibrous organic substance in an amount of 0.5 parts by mass to 9.0 parts by mass based on 100 parts by mass the metal oxide particles.

While the solvent is not specifically limited, an example of the solvent includes water (in some embodiments, pure water, such as ion exchanged water and distilled water, may be used).

The fibrous organic substance is not particularly limited as long as it is a substance that can be removed by a heating step described below, and examples thereof include a polyethylene terephthalate (PET) fiber, an acrylic fiber, a nylon fiber, a rayon fiber, and a cellulose fiber. In some embodiments, at least one selected from the group consisting of a PET fiber and a nylon fiber may be used among them in terms of a balance between processability and the firing temperature. By using a catalyst slurry containing such a fibrous organic substance and at least partially removing the fibrous organic substance in a subsequent step, voids having the same shape as that of the fibrous organic substance can be formed in the catalyst coating layer. The voids thus formed can serve as a diffusion path of exhaust gas and the resulting catalyst can exhibit excellent catalyst performance even in a region under a high load with a high flow rate of gas.

The fibrous organic substance for use in the catalyst production method of the present disclosure has an average fiber diameter in the range from 1.7 µm to 8.0 µm. Too small an average fiber diameter does not impart an effective high-aspect-ratio pore, resulting in insufficient catalyst performance. On the other hand, too large an average fiber diameter increases the thickness of the catalyst coating layer, thereby increasing pressure loss to cause deterioration in fuel efficiency. Any average fiber diameter in the above range does not cause such problems. In some embodiments, the average fiber diameter of the fibrous organic substance may be in the range from 2.0 µm to 6.0 µm, in terms of a balance between catalyst performance and coating thickness. In some embodiments, the average fiber diameter of the fibrous organic substance may be in the range from 2.0 µm to 5.0 µm, in terms of a balance between catalyst performance and coating thickness.

The fibrous organic substance for use in the catalyst production method of the present disclosure has an average aspect ratio in the range from 9 to 40. Too low an average aspect ratio results in insufficient pore connectivity to thereby cause gas diffusivity to be insufficient. On the other hand, too high an average aspect ratio causes too high a diffusivity to thereby increase a proportion of gas passing through the coating layer without coming into contact with a catalytic active site, not imparting sufficient catalyst performance. Any average aspect ratio in the above range does not cause such problems. In some embodiments, the average aspect ratio of the fibrous organic substance may be in the range from 9 to 30, in terms of a balance between gas diffusivity and catalyst performance. In some embodiments, the average aspect ratio of the fibrous organic substance may be in the range from 9 to 28, in terms of a balance between gas diffusivity and catalyst performance. Herein, the average aspect ratio of the fibrous organic substance is defined as an "average fiber length/average fiber diameter". Herein, the fiber length means the linear distance for connecting the starting point and the end point of the fiber. The average fiber length can be determined by randomly extracting 50 or more of the fibrous organic substances, measuring the fiber length of each of the fibrous organic substances, and calculating an average value. In addition, the average fiber diameter can be determined by randomly extracting 50 or more of the fibrous organic substances, measuring the fiber diameter of each of the fibrous organic substances, and calculating an average value.

In the catalyst production method of the present disclosure, the fibrous organic substance is used in an amount of 0.5 parts by mass to 9.0 parts by mass based on 100 parts by mass of the metal oxide particles in a catalyst slurry for formation of the catalyst coating layer. Too small an amount of the fibrous organic substance mixed fails to impart sufficient pore connectivity, resulting in insufficient catalyst performance. On the other hand, too large an amount thereof increases the thickness of the catalyst coating layer, thereby increasing pressure loss to cause deterioration in fuel efficiency. Any amount in the above range does not cause such problems. In some embodiments, the fibrous organic substance may be used in an amount of 0.5 parts by mass to 8.0 parts by mass based on 100 parts by mass of the metal oxide particles in the catalyst slurry, in terms of a balance between catalyst performance and pressure loss. In some embodiments, the fibrous organic substance may be 0.5 parts by mass to 5.0 parts by mass based on 100 parts by mass of the metal oxide particles in the catalyst slurry, in terms of a balance between catalyst performance and pressure loss. In some embodiments, the fibrous organic substance may have an average fiber diameter in the range from 2.0 µm to 6.0 µm and an average aspect ratio in the range from 9 to 30.

The method for preparing the catalyst slurry is not particularly limited. The metal oxide particles, and the fibrous organic substance may be mixed, if necessary with a known binder or the like, and a known method can be appropriately adopted. Herein, conditions of such mixing are not particularly limited. In some embodiments, the stirring speed and the treatment time may be in the range from, for example, 100 rpm to 400 rpm and 30 minutes or more, respectively, and the fibrous organic substance may be uniformly dispersed and mixed in the catalyst slurry. The mixing order is not particularly limited, and there may be adopted any of the following methods, for example: a method where the fibrous organic substance is mixed with a dispersion liquid including the metal oxide particles; a method where the metal oxide particles are mixed with a dispersion liquid including the fibrous organic substance. Treatment conditions are not particularly limited, and are appropriately selected depending on the design of the intended exhaust gas purification catalyst or the like.

In some embodiments, the surface of the substrate, or optionally the lower catalyst coating layer on the substrate may be coated with the catalyst slurry containing the metal oxide particles and the fibrous organic substance to thereby form a catalyst slurry layer such that the amount of coating of the catalyst coating layer after firing may be in a range from 50 g/L to 300 g/L based on the unit volume of the substrate and that the average thickness of the catalyst coating layer after firing may be in the range from 50 µm to 100 µm. The coating method is not particularly limited, and a known method can be appropriately adopted. Specific examples include a method where a honeycomb-shaped substrate is dipped in to coat the substrate with the catalyst slurry (dipping method), a wash coat method, and a method where the catalyst slurry is injected by an injection means. Herein, the surface of the honeycomb-shaped substrate is needed to be coated with the catalyst slurry under coating conditions such that the following are satisfied: the amount of coating of the catalyst coating layer after firing is in the range from 50 g/L to 300 g/L based on the unit volume of the substrate, and the average thickness of the catalyst coating layer after firing is in the range from 50 µm to 100 µm.

In the catalyst production method of the present disclosure, the substrate is coated with the catalyst slurry, and then heated to thereby evaporate the solvent or the like included in the slurry and also remove the fibrous organic substance. Such heating is typically conducted by firing the substrate coated with the catalyst slurry. In some embodiments, such firing may be conducted at a temperature in the range from 300 to 800° C. In some embodiments, such firing may be conducted at a temperature in the range from 400 to 700° C. Too low a firing temperature tends to cause the fibrous organic substance to remain, and on the other hand, too high a firing temperature tends to sinter the particle. Any firing temperature in the above range does not cause such problems. The firing time varies depending on the firing temperature. In some embodiments, the firing time may be 20 minutes or more. In some embodiments, the firing time may be 30 minutes to 2 hours. Furthermore, the atmosphere in firing is not particularly limited. In some embodiments, the atmosphere in firing may be in the air or in an atmosphere of inert gas such as nitrogen ($N_2$).

The exhaust gas purification catalyst including two or more catalyst coating layers can be prepared by coating the substrate with the catalyst slurry and heating it to thereby form the catalyst coating layer on the substrate, and coating again the resultant with a catalyst slurry optionally different therefrom in composition, namely, the amounts and the types of the metal oxide, the noble metal and the like, and heating it, in a repeated manner. The exhaust gas purification catalyst including two or more catalyst coating layers can be prepared by using a catalyst slurry including noble metal particles and metal oxide particles to form a lower catalyst coating layer, and then using a catalyst slurry including metal oxide particles and a fibrous organic substance to form an uppermost catalyst coating layer precursor thereon.

After the catalyst coating layer precursor is formed on the substrate, the noble metal particles having the catalytic activity is supported on the catalyst coating layer precursor.

The noble metal raw material for preparation of the noble metal particles is not particularly limited, and examples thereof include a solution obtained by dissolving a salt (for example, acetate, carbonate, nitrate, an ammonium salt, citrate, or a dinitrodiammine salt) of a noble metal (for example, Pt, Rh, Pd or Ru, or a compound thereof), or a complex thereof (for example, a tetraammine complex) in a solvent such as water or alcohol. In addition, the amount of the noble metal is not particularly limited, the noble metal may be appropriately supported in a required amount depending on the intended design and the like. In some embodiments, the amount may be 0.01% by mass or more. Herein, when platinum is used as the noble metal, a platinum salt is not particularly limited, and examples thereof include acetate, carbonate, nitrate, an ammonium salt, citrate or a dinitrodiammine salt of platinum (Pt), or a complex thereof. In some embodiments, a dinitrodiammine salt may be used among them because it is easily supported and has a high dispersibility. When palladium is used as the noble metal, a palladium salt is not particularly limited, and examples thereof include a solution of acetate, carbonate, nitrate, an ammonium salt, citrate, a dinitrodiammine salt of palladium (Pd), or a complex thereof. In some embodiments, nitrate or a dinitrodiammine salt may be used among them because it is easily supported and has a high dispersibility. When rhodium is used as the noble metal, a rhodium salt is not particularly limited, and examples thereof include a solution of acetate, carbonate, nitrate, an ammonium salt, citrate, a dinitrodiammine salt of rhodium (Rh), or a complex thereof. In some embodiments, nitrate or a dinitrodiammine salt may be used among them because it is easily supported and has a high dispersibility. Furthermore, the solvent is not particularly limited, and examples thereof include a solvent that can allow dissolution in the form of an ion, such as water (in some embodiments, pure water, such as ion-exchange water and distilled water, may be used).

The above-described concentration gradient of the noble metal can be formed in the catalyst coating layer by adjusting pH of the noble metal raw material usually to 2 to 3.

Except that the pH of the noble metal raw material is adjusted as described above, the method for supporting the noble metal particles to the catalyst coating layer precursor is not particularly limited and the known method can be appropriately employed. Specific examples include a method where a honeycomb-shaped substrate over which the catalyst coating layer precursor has been applied is dipped in the noble metal raw material to coat the substrate with the noble metal raw material (dipping method), a wash coat method, and a method where the noble metal raw material is press-fitted by press fitting means.

In the catalyst production method of the present disclosure, the catalyst coating layer precursor is coated with the novel metal raw material, and then heated to thereby evaporate the solvent or the like included in the novel metal raw material and also support the noble metal. Such heating is typically conducted by firing the catalyst coating layer precursor coated with the novel metal raw material. In some embodiments, such firing may be conducted at a temperature in the range from 300° C. to 800° C. In some embodiments, such firing may be conducted at a temperature in the range from 400° C. to 700° C. Too low a firing temperature tends to cause the solvent to remain, and on the other hand, too high a firing temperature tends to sinter the noble metal particle. Any firing temperature in the above range does not cause such problems. The firing time varies depending on the firing temperature. In some embodiments, the firing time may be 20 minutes or more. In some embodiments, the firing time may be 30 minutes to 2 hours. Furthermore, the atmosphere in firing is not particularly limited. In some embodiments, the atmosphere in firing may be in the air or in an atmosphere of inert gas such as nitrogen ($N_2$).

The exhaust gas purification catalyst of the present disclosure is used for a method for purifying exhaust gas where exhaust gas discharged from an internal combustion engine is brought into contact with the catalyst. The method for bringing exhaust gas into contact with the exhaust gas purification catalyst is not particularly limited, and a known method can be appropriately adopted. For example, a method may be adopted where the exhaust gas purification catalyst according to the present disclosure is disposed in an exhaust gas tube through which gas discharged from an internal combustion engine flows, thereby bringing exhaust gas discharged from an internal combustion engine into contact with the exhaust gas purification catalyst.

The exhaust gas purification catalyst of the present disclosure exhibits excellent catalyst performance even in a region under a high load with a high flow rate of gas. Therefore, for example, when exhaust gas discharged from an internal combustion engine of an automotive or the like is brought into contact with the exhaust gas purification catalyst of the present disclosure, exhaust gas can be purified even in a region under a high load with a high flow rate of gas. The exhaust gas purification catalyst of the present disclosure can be used for purifying harmful components such as harmful gases (hydrocarbon (HC), carbon monoxide (CO), nitrogen oxides (NOx)) in exhaust gas discharged from an internal combustion engine of an automotive or the like.

EXAMPLES

While the following describes the present disclosure in further detail using the examples, the present disclosure is not limited to these examples.

I. Preparation of Catalyst

I-1. Used Materials

Material 1 ($Al_2O_3$)
 4% by mass-$La_2O_3$ composite $Al_2O_3$
Material 2 (ZC)
 21% by mass-$CeO_2$, 72% by mass-$ZrO_2$, 1.7% by mass-$La_2O_3$, 5.3% by mass-$Y_2O_3$ composite oxide
Material 3 (Rh)
 Nitric acid Rh
Material 4 (Fibrous Organic Substance)
 Organic fiber
Substrate
 Cordierite honeycomb substrate with 875 cc (400 cells: square, wall thickness of 4 mil)

I-2. Preparation of Catalyst

Example 1

First, the material 1, the material 2, and $Al_2O_3$-based binder were introduced into distilled water while stirred, and after the stirring for about 10 minutes, the material 4 was introduced and stirred for about 10 minutes to prepare a suspended slurry 1.

Next, the prepared slurry 1 was poured into the substrate and unnecessary content was blown off with a blower to coat the material on a wall surface of the substrate. At that time, the material 1 was adjusted so as to be 50 g per liter of the volume of the substrate (50 g/L), and the material 2 was adjusted so as to be 30 g per liter of the volume of the substrate (30 g/L). After the coating by 100% to the overall length of the substrate, water was removed for two hours by a dryer held at 120° C., and the substrate was fired for two hours by an electric furnace held at 500° C. to prepare a catalyst coating layer precursor.

The material 3 and distilled water were mixed to prepare Rh solution with the pH adjusted to 2 and the Rh solution was absorbed into the catalyst coating layer precursor, and unnecessary content was blown off with a blower, and thus the Rh was supported to the catalyst coating layer precursor. After water was removed for two hours by a dryer held at 120° C., the substrate was fired for two hours by an electric furnace held at 500° C. to prepare a catalyst coating layer.

Example 2

Except that the pH of the Rh solution was adjusted to 2 to 3, a catalyst coating layer was prepared similarly to Example 1.

Example 3

Except that the pH of the Rh solution was adjusted to 2 to 3, a catalyst coating layer was prepared similarly to Example 1.

Comparative Example 1

Except that the pH of the Rh solution was adjusted to 4, a catalyst coating layer was prepared similarly to Example 1.

Comparative Example 2

Except that the pH of the Rh solution was adjusted to 1, a catalyst coating layer was prepared similarly to Example 1.

Comparative Example 3

Except that the material 4 was not used and the pH of the Rh solution was adjusted to 1 to 4, a catalyst coating layer was prepared similarly to Example 1.

Comparative Example 4

Except that the material 4 was not used and the pH of the Rh solution was adjusted to 1 to 4, a catalyst coating layer was prepared similarly to Example 1.

Comparative Example 5

Except that the material 4 was not used and the pH of the Rh solution was adjusted to 1 to 4, a catalyst coating layer was prepared similarly to Example 1.

Comparative Example 6

Except that the material 4 was not used and the pH of the Rh solution was adjusted to 1 to 4, a catalyst coating layer was prepared similarly to Example 1.

Comparative Example 7

Except that the material 4 was not used and the pH of the Rh solution was adjusted to 1 to 4, a catalyst coating layer was prepared similarly to Example 1.

Table 1 summarizes catalyst structures of exhaust gas purification catalysts of Examples 1 to 3 and Comparative Examples 1 to 7.

TABLE 1

List of standard for preparation of examples and comparative examples

| Sample | Slurry | | | Amount of noble metal g/L | Rh support depth % |
|---|---|---|---|---|---|
| Comparative Example 1 | Material 1 | $Al_2O_3$ | 50 g/L | Rh 0.45 | 11 |
|  | Material 2 | ZC | 30 g/L | | |
|  | Material 4 | Organic fiber | 3 mass % | | |
| Example 1 | Material 1 | $Al_2O_3$ | 50 g/L | Rh 0.45 | 27 |
|  | Material 2 | ZC | 30 g/L | | |
|  | Material 4 | Organic fiber | 3 mass % | | |
| Example 2 | Material 1 | $Al_2O_3$ | 50 g/L | Rh 0.45 | 55 |
|  | Material 2 | ZC | 30 g/L | | |
|  | Material 4 | Organic fiber | 3 mass % | | |
| Example 3 | Material 1 | $Al_2O_3$ | 50 g/L | Rh 0.45 | 66 |
|  | Material 2 | ZC | 30 g/L | | |
|  | Material 4 | Organic fiber | 3 mass % | | |
| Comparative Example 2 | Material 1 | $Al_2O_3$ | 50 g/L | Rh 0.45 | 100 |
|  | Material 2 | ZC | 30 g/L | | |
|  | Material 4 | Organic fiber | 3 mass % | | |
| Comparative Example 3 | Material 1 | $Al_2O_3$ | 50 g/L | Rh 0.45 | 8 |
|  | Material 2 | ZC | 30 g/L | | |
|  | Material 4 | Organic fiber | None | | |
| Comparative Example 4 | Material 1 | $Al_2O_3$ | 50 g/L | Rh 0.45 | 31 |
|  | Material 2 | ZC | 30 g/L | | |
|  | Material 4 | Organic fiber | None | | |
| Comparative Example 5 | Material 1 | $Al_2O_3$ | 50 g/L | Rh 0.45 | 51 |
|  | Material 2 | ZC | 30 g/L | | |
|  | Material 4 | Organic fiber | None | | |
| Comparative Example 6 | Material 1 | $Al_2O_3$ | 50 g/L | Rh 0.45 | 62 |
|  | Material 2 | ZC | 30 g/L | | |
|  | Material 4 | Organic fiber | None | | |
| Comparative Example 7 | Material 1 | $Al_2O_3$ | 50 g/L | Rh 0.45 | 100 |
|  | Material 2 | ZC | 30 g/L | | |
|  | Material 4 | Organic fiber | None | | |

Here, when the surface side in contact with the exhaust gas in the thickness direction of the catalyst coating layer is defined as 0% and the side in contact with the substrate is defined as 100%, the Rh support depth (%) means a depth at which 80% by mass of the total amount of Rh is present. Accordingly, for example, 80% by mass of the total amount of Rh is present in the range from 0% to 11% in Comparative Example 1, 80% by mass of the total amount of Rh is present in the range from 0% to 27% in Example 1, 80% by mass of the total amount of Rh is present in the range from 0% to 55% in Example 2, 80% by mass of the total amount of Rh is present in the range from 0% to 66% in Example 3, and 80% by mass of the total amount of Rh is present in the range from 0% to 100% in Comparative Example 2.

II. Evaluation on Catalyst

First, using the actual engine, the following durability test was conducted on the exhaust gas purification catalysts of Examples 1 to 3 and Comparative Examples 1 to 7.

The durability test was conducted as follows. The exhaust gas purification catalysts were each mounted to an exhaust system of a V-type eight-cylinder engine, exhaust gases under respective stoichiometric and lean atmospheres were repeatedly flown by a certain period of time (a ratio of 3:1) at a catalyst bed temperature of 900° C. for 50 hours.

Subsequently, the following performance evaluation was conducted on the exhaust gas purification catalysts of Examples 1 to 3 and Comparative Examples 1 to 7 on which the durability test had been conducted.

The exhaust gas purification catalysts were each mounted to an exhaust system of an L-type four-cylinder engine, exhaust gases with Ga=40 g/s and an air-fuel ratio (A/F) of 14.4 were supplied at a catalyst bed temperature of 550° C., and NOx conversion efficiency was calculated.

Figure 5:
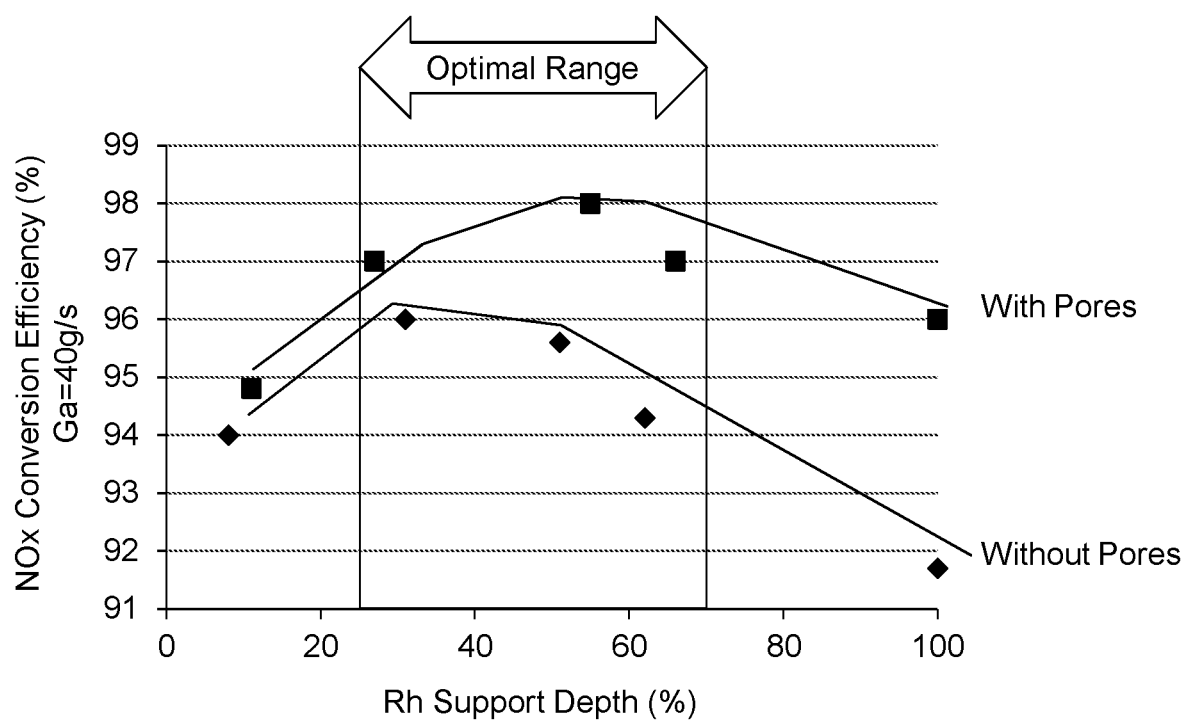
FIG. 5 is a diagram illustrating a relationship between Rh support depths and NOx conversion performances in exhaust gas purification catalysts of Examples 1 to 3 and Comparative Examples 1 to 7.

FIG. 5 illustrates the results. The following has been found from FIG. 5. When the surface side in contact with the exhaust gas in the thickness direction of the catalyst coating layer is defined as 0% and the side in contact with the substrate is defined as 100%, in the case where 80% by mass of the total Rh is present in the range from 0% to 25% or more and 70% or less, or the 80% by mass of the total Rh is in the range from 0% to 27% or more and 66% or less, or the 80% by mass of the total Rh is in the range from 0% to 35% or more and 60% or less, the NOx conversion efficiency becomes high.

All documents, patents and patent publications cited in the present description are herein incorporated by reference as they are.

The invention claimed is:
1. An exhaust gas purification catalyst comprising a catalyst coating layer on a substrate, the catalyst coating layer containing a noble metal and a metal oxide, wherein in the catalyst coating layer:
an average thickness of the coating layer is in a range from 50 μm to 100 μm;
a porosity measured by a weight-in-water method is in a range from 50% by volume to 80% by volume; and
high-aspect-ratio pores having an aspect ratio of 5 or more account for 0.5% by volume to 50% by volume of a whole volume of voids, the high-aspect-ratio pore having an equivalent circle diameter in a range from 2 μm to 50 μm in a cross-sectional image of a catalyst coating layer cross section perpendicular to an exhaust gas flow direction of the substrate and having an average aspect ratio in a range from 10 to 50, and
wherein when a surface side in contact with an exhaust gas in a thickness direction of the catalyst coating layer is defined as 0% of thickness and a side in contact with the substrate is defined as 100% of thickness, 80% or more of a total amount by mass of the noble metal is present in a range from 25% of thickness or more and 70% of thickness or less.

2. The exhaust gas purification catalyst according to claim 1,
wherein in the catalyst coating layer, the high-aspect-ratio pore is oriented such that a value of an 80% cumulative angle, in a cumulative angle distribution on an angle basis, of an angle (cone angle) between a vector in a longitudinal direction of the high-aspect-ratio pore and a vector in the exhaust gas flow direction of the substrate is in a range from 0 to 45 degrees.

3. The exhaust gas purification catalyst according to claim 2,
wherein in the catalyst coating layer, an amount of coating is in a range from 50 g/L to 300 g/L based on a unit volume of the substrate.

4. The exhaust gas purification catalyst according to claim 3,
wherein when a surface side in contact with the exhaust gas is defined as 0% of thickness and a side in contact with the substrate is defined as 100% in the thickness direction of the catalyst coating layer, 80% or more of a total amount by mass of the noble metal is present in a range from 27% of thickness or more and 66% of thickness or less.

5. The exhaust gas purification catalyst according to claim 2,
wherein when a surface side in contact with the exhaust gas is defined as 0% of thickness and a side in contact with the substrate is defined as 100% in the thickness direction of the catalyst coating layer, 80% or more of a total amount by mass of the noble metal is present in a range from 27% of thickness or more and 66% of thickness or less.

6. The exhaust gas purification catalyst according to claim 1,
wherein in the catalyst coating layer, an amount of coating is in a range from 50 g/L to 300 g/L based on a unit volume of the substrate.

7. The exhaust gas purification catalyst according to claim 6,
wherein when a surface side in contact with the exhaust gas is defined as 0% and a side in contact with the substrate is defined as 100% in the thickness direction of the catalyst coating layer, 80% by mass or more of a total amount of the noble metal is present in a range from 27% or more and 66% or less.

8. The exhaust gas purification catalyst according to claim 1,
wherein when a surface side in contact with the exhaust gas is defined as 0% of thickness and a side in contact with the substrate is defined as 100% in the thickness direction of the catalyst coating layer, 80% or more of a total amount by mass of the noble metal is present in a range from 27% of thickness or more and 66% of thickness or less.

\* \* \* \* \*

UNITED STATES PATENT AND TRADEMARK OFFICE
CERTIFICATE OF CORRECTION

PATENT NO. : 11,053,833 B2
APPLICATION NO. : 16/857566
DATED : July 6, 2021
INVENTOR(S) : Isao Chinzei et al.

It is certified that error appears in the above-identified patent and that said Letters Patent is hereby corrected as shown below:

On the Title Page

Item [73], insert:
-- TOYOTA JIDOSHA KABUSHIKI KAISHA, Toyota (JP)
CATALER CORPORATION, Kakegawa (JP) --

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*